US011752453B1

(12) United States Patent
Yeomans et al.

(10) Patent No.: US 11,752,453 B1
(45) Date of Patent: Sep. 12, 2023

(54) DEAERATION DEVICE FOR THERMAL SYSTEM

(71) Applicants: Paul D. Yeomans, Morgan Hill, CA (US); Vincent G. Johnston, Half Moon Bay, CA (US); John M. Kearney, San Jose, CA (US)

(72) Inventors: Paul D. Yeomans, Morgan Hill, CA (US); Vincent G. Johnston, Half Moon Bay, CA (US); John M. Kearney, San Jose, CA (US)

(73) Assignee: APPLE INC., Cupertino, CA (US)

( * ) Notice: Subject to any disclaimer, the term of this patent is extended or adjusted under 35 U.S.C. 154(b) by 87 days.

(21) Appl. No.: 17/577,901

(22) Filed: Jan. 18, 2022

Related U.S. Application Data

(63) Continuation of application No. 16/120,569, filed on Sep. 4, 2018, now Pat. No. 11,260,320.

(60) Provisional application No. 62/647,979, filed on Mar. 26, 2018, provisional application No. 62/571,909, filed on Oct. 13, 2017.

(51) Int. Cl.
*B01D 19/00* (2006.01)

(52) U.S. Cl.
CPC ..... *B01D 19/0047* (2013.01); *B01D 19/0063* (2013.01)

(58) Field of Classification Search
None
See application file for complete search history.

(56) References Cited

U.S. PATENT DOCUMENTS

| 4,352,683 | A | 10/1982 | Vogel |
| 6,216,646 | B1 | 4/2001 | Smith et al. |
| 7,631,619 | B2 | 12/2009 | Bangert et al. |
| 2005/0081716 | A1 | 4/2005 | Morita et al. |
| 2008/0110344 | A1 | 5/2008 | Follette et al. |
| 2008/0190385 | A1 | 8/2008 | Bangert et al. |
| 2009/0277401 | A1 | 11/2009 | Theorell |
| 2010/0012056 | A1 | 1/2010 | Benet |
| 2012/0180997 | A1 | 7/2012 | Johnston et al. |
| 2013/0327511 | A1 | 12/2013 | Johnston et al. |
| 2017/0130641 | A1 | 5/2017 | Kennedy et al. |

*Primary Examiner* — Christopher P Jones
*Assistant Examiner* — Phillip Y Shao
(74) *Attorney, Agent, or Firm* — Young Basile Hanlon & MacFarlane, P.C.

(57) ABSTRACT

A deaeration device for a fluid includes a reservoir that contains a portion of the fluid, a fluid flow path that carries a portion of the fluid, a pressure regulating structure that creates a pressure gradient along the fluid flow path, a fluid exit in the fluid flow path, and a fluid entrance in the fluid flow path. The pressure gradient causes some of the fluid to exit the fluid flow path through the fluid exit and join the fluid in the reservoir. The pressure gradient causes some of the fluid from the reservoir to join the fluid flow path through the fluid entrance.

20 Claims, 9 Drawing Sheets

DEAERATION DEVICE FOR THERMAL SYSTEM

CROSS-REFERENCE TO RELATED APPLICATIONS

This application claims the benefit of U.S. Provisional Application No. 62/571,909, filed on Oct. 13, 2017, and U.S. Provisional Application No. 62/647,979, filed on Mar. 26, 2018, and is a continuation of United Stated Patent application Ser. No. 16/120,569, filed on Sep. 4, 2018, the contents of which are hereby incorporated by reference in their entirety for all purposes.

TECHNICAL FIELD

The application relates generally to thermal heating and/or cooling systems that utilize a liquid media.

BACKGROUND

Liquid heating and/or cooling systems circulate a liquid media through a system. The liquid media travels between components before returning to its starting point, in what is commonly referred to as a thermal loop, a cooling loop, or a heating loop. Air can be introduced into the liquid media, for example, during filling, when the liquid media is added to the system. Air bubbles in the liquid media can cause corrosion to some portions of the system and can cause damage to some portions of the system. The presence of air in the liquid media can also reduce the thermal performance, flow rate, and heat capacity of the system.

SUMMARY

One aspect of the disclosed embodiments is a deaeration device for a fluid. The deaeration device includes a reservoir that contains a portion of the fluid, a fluid flow path that carries a portion of the fluid, a pressure regulating structure that creates a pressure gradient along the fluid flow path, a fluid exit in the fluid flow path, and a fluid entrance in the fluid flow path. The pressure gradient causes some of the fluid to exit the fluid flow path through the fluid exit and join the fluid in the reservoir. The pressure gradient causes some of the fluid from the reservoir to join the fluid flow path through the fluid entrance.

In some implementations, the fluid exit is located at a first end of the pressure regulating structure in a high-pressure region and the fluid entrance is located at a second end of the pressure regulating structure in a low-pressure region.

In some implementations, a first portion of the fluid flow path is located before the pressure regulating structure in a fluid-flow direction, a second portion of the fluid flow path is located after the pressure regulating structure in the fluid-flow direction, and a first elevation of the first portion of the fluid flow path is higher than a second elevation of a second portion of the fluid flow path.

In some implementations, the pressure regulating structure includes a reverse curvature defined along the fluid flow path. The reverse curvature may include a first curve and a second curve, wherein the fluid exit is located along the first curve, and the fluid entrance is located along the second curve. Alternatively, the reverse curvature may include a first curve and a second curve, wherein the fluid exit is located before the first curve in a fluid flow direction, and the fluid entrance is after the second curve in a fluid flow direction.

In some implementations, the fluid exit includes a single opening and the fluid entrance includes a single opening. In some implementations, the fluid exit includes multiple openings and the fluid entrance includes multiple openings.

In some implementations, the fluid flow path is defined by a conduit. The conduit may extend through the reservoir.

Another aspect of the disclosed embodiments is a deaeration device for a fluid. The deaeration device includes a reservoir that contains a portion of the fluid and a fluid flow path that carries a portion of the fluid. A baffle structure that is disposed in the reservoir and defines a first chamber, a second chamber, and one or more intermediate chambers in the reservoir. A curvature is defined along the fluid flow path. The curvature serves as a pressure regulating structure that creates a pressure gradient along the fluid flow path. A fluid exit is defined in the fluid flow path and is in communication with the first chamber. The pressure gradient causes some of the fluid to exit the fluid flow path through the fluid exit and join the fluid in the reservoir. A fluid entrance is in the fluid flow path and is in communication with the second chamber. The pressure gradient causes some of the fluid from the reservoir to join the fluid flow path through the fluid entrance. The baffle structure causes fluid from the first chamber to travel through the one or more intermediate chambers before reaching the second chamber.

In some implementations, the fluid flow path passes through the baffle structure. In some implementations, the curvature includes a curve that extends through an arc that is greater than ninety degrees. In some implementations, the curvature includes a curve that extends through an arc that is at least one-hundred and eighty degrees. In some implementations, the fluid exit is located along the curve and the fluid exit is located after the curve. In some implementations, the fluid flow path is defined by a conduit. In some implementations, the conduit extends through the reservoir.

Another aspect of the disclosed embodiments is a thermal system that circulates a fluid. The thermal system includes a pump, a functional component that generates heat, a cooling device, and a deaeration device. The deaeration device includes a reservoir that contains a portion of the fluid, a fluid flow path that carries a portion of the fluid, and a curvature that is formed in the fluid flow path to create a pressure gradient along the fluid flow path. A fluid exit is defined in the fluid flow path, wherein the pressure gradient causes some of the fluid to exit the fluid flow path through the fluid exit and join the fluid in the reservoir. A fluid entrance is defined in the fluid flow path, wherein the pressure gradient causes some of the fluid from the reservoir to join the fluid flow path through the fluid entrance. The thermal system also includes conduits that interconnect the pump, the functional component, the cooling device, and the deaeration device.

The deaeration device may also include a baffle structure that is disposed in the reservoir and defines a first chamber, a second chamber, and one or more intermediate chambers in the reservoir, wherein the fluid exit is in communication with the first chamber of the baffle structure, the fluid entrance is in communication with the second chamber of the baffle structure, the baffle structure causes fluid from the first chamber to travel through the one or more intermediate chambers before reaching the second chamber, and the fluid flow path passes through the baffle structure.

In some implementations, the curvature that is formed in the fluid flow path includes a curve that extends through an arc that is at least one-hundred and eighty degrees, the fluid exit is located along the curve, and the fluid exit is located after the curve.

DETAILED DESCRIPTION

Traditional high flow liquid cooling systems use a constant bleed. This means that some of the fluid flow that would otherwise be used to cool functional devices is constantly being lost back to the reservoir, which reduces efficiency. This efficiency loss has been considered acceptable in internal combustion engine designs, which by design operate at high temperatures and with relatively low efficiency.

Traditional low flow liquid cooling systems pass all of their fluid flow directly through a reservoir. While this approach is acceptable at low flow rates, at higher flow rates the liquid in the reservoir will become turbulent and aeration results.

Electric vehicles operate at higher efficiency levels as compared to internal combustion engine vehicles, and at much lower temperatures. The efficiency penalty of a constant-bleed deaeration system would have a detrimental impact on the overall effectiveness of the cooling system in an electric vehicle application.

The disclosure herein is directed to a thermal system that includes a deaeration device that operates at high flow rates with much higher efficiency as compared to constant bleed systems. As an example, the deaeration device may include a fluid flow path that extends through a reservoir and defines a reverse curve (i.e., an S-curve). The reverse curve creates a pressure differential between a first opening and a second opening. The first opening expels air and liquid into the reservoir. The second opening entrains liquid into the fluid flow path. A portion (e.g., a majority) of the liquid carried by the fluid flow path remains in the fluid flow path without entering the reservoir.

Figure 1:
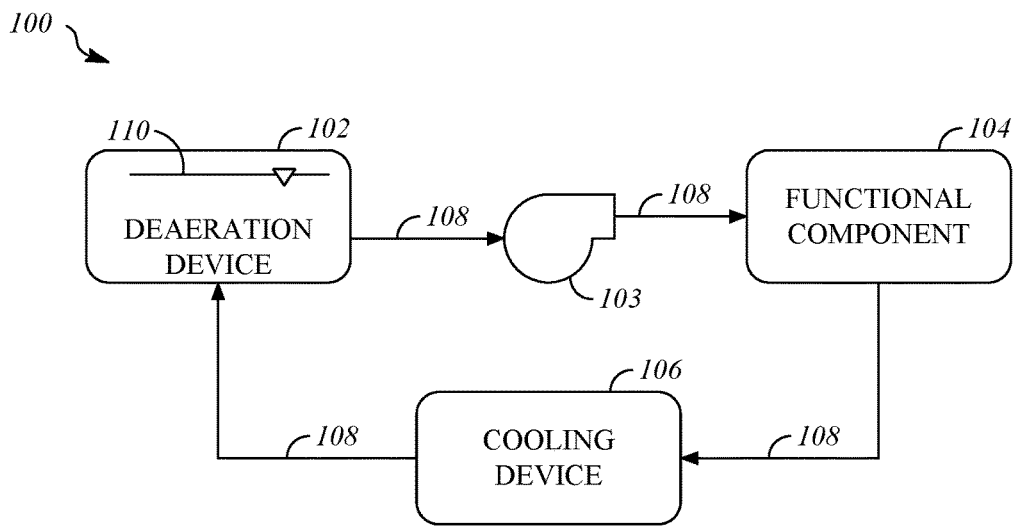
FIG. 1 is a schematic illustration that shows a thermal system.

FIG. 1 is an illustration that shows a thermal system 100. The thermal system 100 includes a deaeration device 102, a pump 103, a functional component 104, and a cooling device 106. The various components of the thermal system 100 are interconnected by conduits 108 that circulate a fluid media 110 between the components.

In the illustrated example, the thermal system 100 is a cooling system, which provides an example of a system in which the deaeration device 102 can be implemented. The deaeration device 102 can also be implemented in a heating system, or a combined heating and cooling system. The pump 103 is connected to the deaeration device 102 by one of the conduits to cause the fluid media 110 to flow from the deaeration device 102 to the functional component 104.

The functional component 104 is a device or system that is to be maintained at a controlled temperature. Thus, a desired temperature can be determined for the functional component 104, and the thermal system 100 is operated to maintain the functional component 104 within an acceptable temperature range relative to the desired temperature by delivery of the fluid media 110 to the functional component 104. The functional component 104 may be one of several devices or systems that are thermally regulated by the thermal system 100. The functional component 104 may be a heat-generating component. As an example, the thermal system 100 can be utilized in an electric vehicle application in which the functional components include batteries, electric motors, and computing devices that control various systems of the vehicle. The fluid media 110 exits the functional component 104 through one of the conduits 108 and is directed to the cooling device 106.

The cooling device 106 may be any device that can reduce the temperature of the fluid media 110. As examples, the cooling device 106 can be a heat exchanger, a heat pump, or a thermoelectric cooler. In implementations in which the thermal system 100 is a heating system, the cooling device 106 may be omitted in favor of a heating device, such as an electric heater. In implementations in which the thermal system 100 is a combined heating and cooling system, a heating device may be included in addition to the cooling device 106.

The conduits 108 are structures that are able to transport liquids, such as the fluid media 110. As an example, the conduits 108 may be hoses. The fluid media 110 can be, for example, an ethylene glycol-based liquid coolant, and may include air bubbles.

Figure 2:
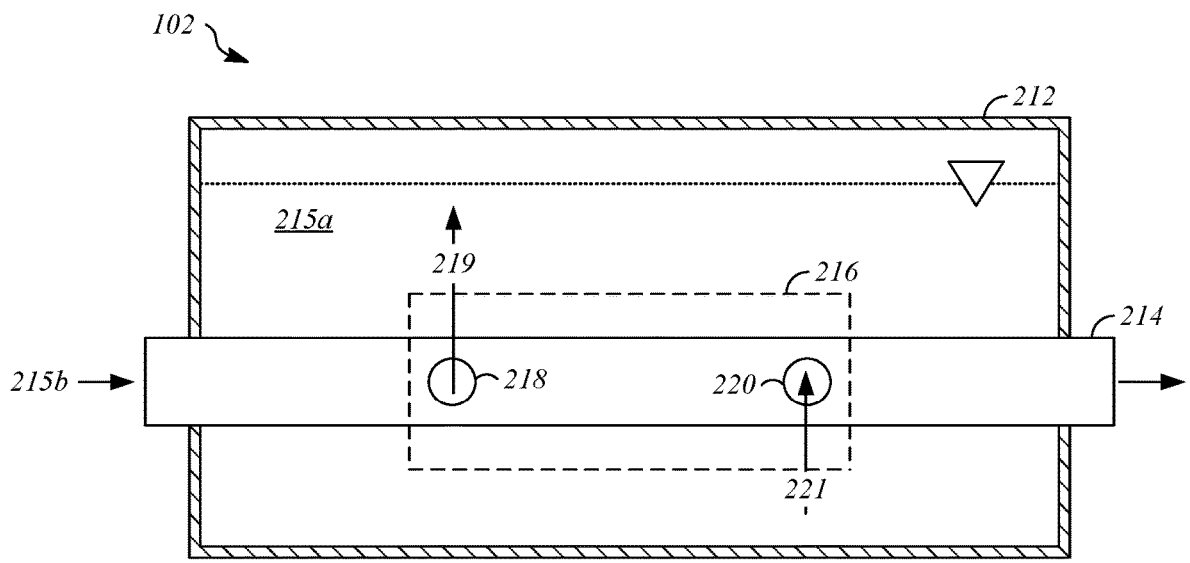
FIG. 2 is a schematic illustration that shows a deaeration device of the thermal system according to a first example.

FIG. 2 is a schematic illustration that shows the deaeration device 102 of the thermal system 100. The deaeration device 102 includes a reservoir 212, a first fluid portion 215a of the fluid media 110 that is held in the reservoir, a fluid flow path defined through a conduit 214, a second fluid portion 215b that is carried by the conduit 214, a pressure regulating structure 216 that is defined along the fluid flow path, a fluid exit 218, and a fluid entrance 220

The reservoir 212 holds the first fluid portion 215a. While the first fluid portion 215a is located in the reservoir 212, air that is mixed into the first fluid portion 215a may settle out of the first fluid portion 215a, such as by rising above a fluid level within the reservoir 212 and joining a volume of air (and/or other gases) that are contained in the reservoir 212 above the fluid level.

The conduit 214 is an example structure that can carry the second fluid portion 215b through or past the reservoir 212 with limited fluid communication between the first fluid portion 215a that is located in the reservoir 212 and the second fluid portion 215b that is carried by the conduit 214. The second fluid portion 215b moves through the conduit 214 in a flow direction, as indicated by arrows in FIG. 2. A majority of the second fluid portion 215b continues through the conduit 214 along the fluid flow path without mixing with the first fluid portion 215a in the reservoir 212.

The pressure regulating structure 216 creates a pressure gradient along the fluid flow path. As used herein, the term "pressure gradient" refers to an area over which the pressure of a fluid changes, for example, by changing from a low pressure at a first point to a high pressure at a second point that is spaced from the first point by a distance. For example, the pressure regulating structure 216 may cause a high-pressure area near the fluid exit 218, and a low-pressure area near the fluid entrance 220. The pressure regulating structure 216 may be any structural configuration of the conduit 214 or any structure that is placed in or defined on the conduit 214 that is operable to change the pressure of the second fluid portion 215b as it flows through the conduit. As examples, the pressure regulating structure may include a curvature (e.g., one or more bends), a restriction, or a baffle.

The fluid exit 218 is located at a first end of the pressure regulating structure 216 in a high-pressure region and the fluid entrance 220 is located at a second end of the pressure regulating structure in a low-pressure region. The fluid exit 218 is a fluid expelling structure that allows a portion of the fluid carried by the fluid flow path to exit the fluid flow path in the conduit 214 and enter the reservoir 212. As an example, the fluid exit 218 may include a single opening that is formed through a wall of the conduit 214, multiple openings that are formed through the wall of the conduit 214, or a discontinuity in the conduit 214. The fluid entrance 220 is a fluid entraining structure that allows a portion of the fluid in the reservoir 212 to enter the conduit 214 and join the fluid flow path. As an example, the fluid entrance 220 may include a single opening that is formed through the wall of the conduit 214, multiple openings that are formed through the wall of the conduit 214, or a discontinuity in the conduit 214.

The pressure gradient causes movement of a portion of the fluid media 110 from the second fluid portion 215b to the first fluid portion 215a. In particular, the pressure gradient created by the pressure regulating structure 216 causes some of the fluid from the second fluid portion 215b of the fluid media 110 to exit the fluid flow path in the conduit 214 through the fluid exit 218, as indicated by arrow 219, and join the first fluid portion 215a of the fluid media 110 in the reservoir 212. The pressure gradient also causes movement of a portion of the fluid media 110 from the first fluid portion 215a to the second fluid portion 215b. In particular, the pressure gradient created by the pressure regulating structure 216 causes some of the fluid from the first fluid portion 215a of the fluid media 110 in the reservoir 212 to enter the fluid flow path in the conduit 214 through the fluid entrance 220, as indicated by arrow 221, and join the second fluid portion 215b.

Movement of the fluid between the second fluid portion 215b and the first fluid portion 215a reduces the amount of air that is present in the second fluid portion 215b that is present in the conduit 214 and is circulated through the thermal system 100. The fluid exit 218 and the fluid entrance 220 are positioned such that the fluid that will leave the conduit 214 through the fluid exit 218 has more air in it than the fluid that will enter the conduit 214 through the fluid entrance 220. For example, the configuration of the reservoir 212 can be such that deaerated fluid tends to collect at a certain location (e.g., at an elevation bottom of the reservoir 212), and the fluid entrance 220 is positioned at such a location.

Figure 3:
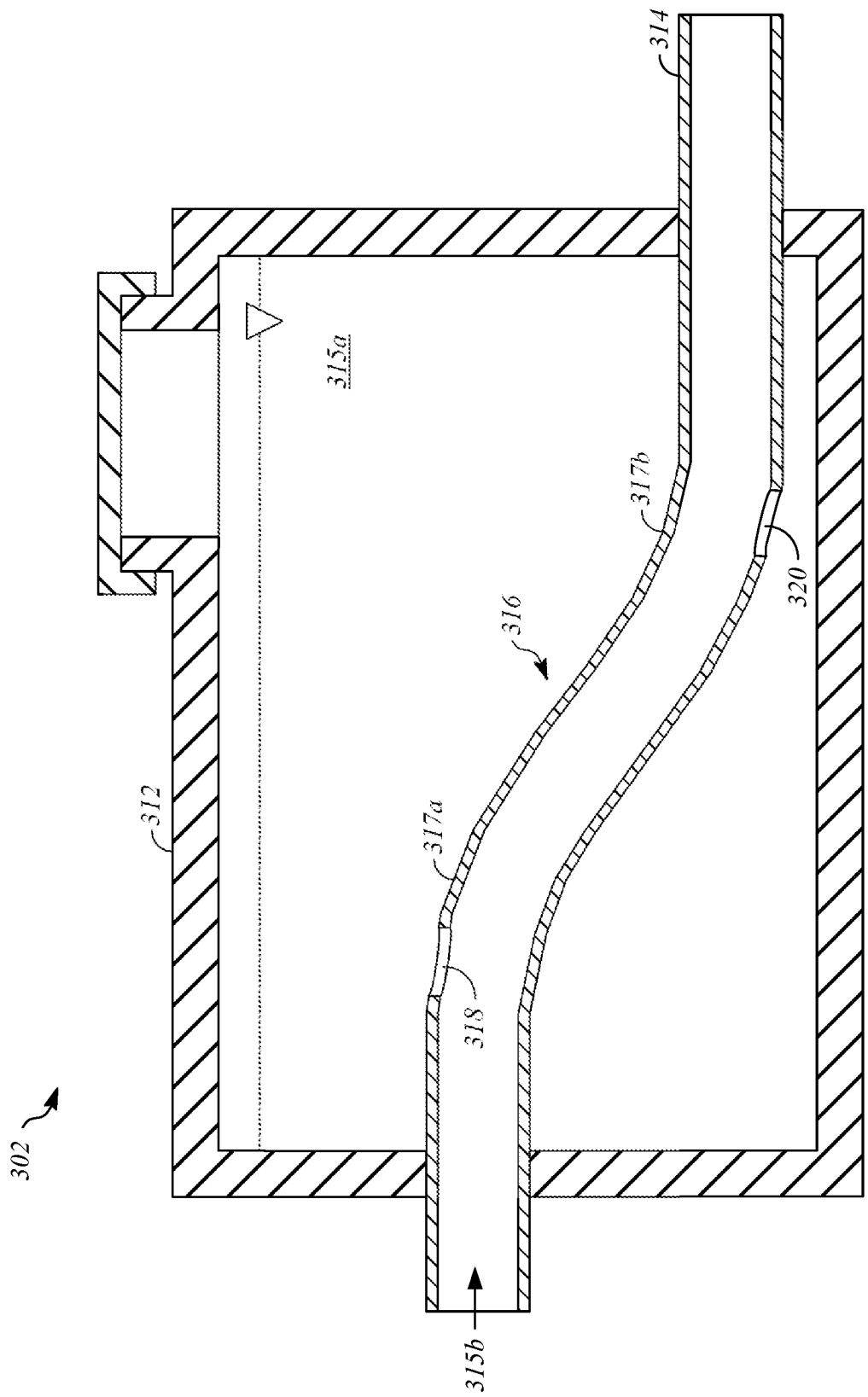
FIG. 3 is a cross-section illustration that shows a deaeration device of the thermal system according to a second example.

FIG. 3 is a cross-section illustration that shows a deaeration device 302 according to a further example that can be incorporated in the thermal system 100 in place of the deaeration device 102. The deaeration device 302 includes a reservoir 312, a first fluid portion 315a in the reservoir 312, a conduit 314, a second fluid portion 315b that follows a fluid flow path in the conduit 314, a reverse curve 316 (i.e., an S-curve) defined by the conduit 314 to function as a pressure regulating structure, a fluid exit 318, and a fluid entrance 320. These components are as described with respect to similar components of the deaeration device 102, except as noted.

In the illustrated example, the conduit 314, the fluid exit 318, and the fluid entrance 320 all have circular cross-sections. The diameters of the fluid exit 318 and the fluid entrance 320 are half or less of the diameter of the inside diameter of the conduit 314. The fluid exit 318 and the fluid entrance 320 can be the same size or can be different sizes. Although the fluid exit 318 and the fluid entrance 320 are depicted as single openings, each can be implemented as multiple openings.

As a pressure regulating structure, the deaeration device 302 includes the reverse curve 316, which is defined along the fluid flow path of the conduit 314. In the illustrated example, the reverse curve 316 includes a first curve 317a and a second curve 317b. In the illustrated example, the fluid exit 318 is located along the first curve 317a on the radially outward side of the conduit 314 relative to the first curve 317a, and the fluid entrance 320 is located along the second curve 317b on the radially outward side of the conduit 314 relative to the second curve 317b. The fluid exit 318 and the fluid entrance 320 can be positioned differently. For example, the fluid exit 318 can be located before the first curve 317a in a fluid flow direction, and the fluid entrance 320 can be located after the second curve 317b in a fluid flow direction.

The conduit 314 includes an elevation change relative to the reservoir 312 at the reverse curve 316. A first portion of the fluid flow path defined by the conduit 314 is located before the reverse curve 316 in a fluid-flow direction, a second portion of the fluid flow path defined by the conduit 314 is located after the reverse curve 316 in the fluid-flow direction, and a first elevation of the first portion of the fluid flow path is higher than a second elevation of a second portion of the fluid flow path.

In the illustrated example, the reverse curve 316 functions as a pressure regulating structure for the conduit 314 and includes two curves in opposite directions. In alternative implementations, additional curves can be included in the conduit 314. For example, four curves can be formed in the conduit 314 to function as a pressure regulating structure.

Figure 4:
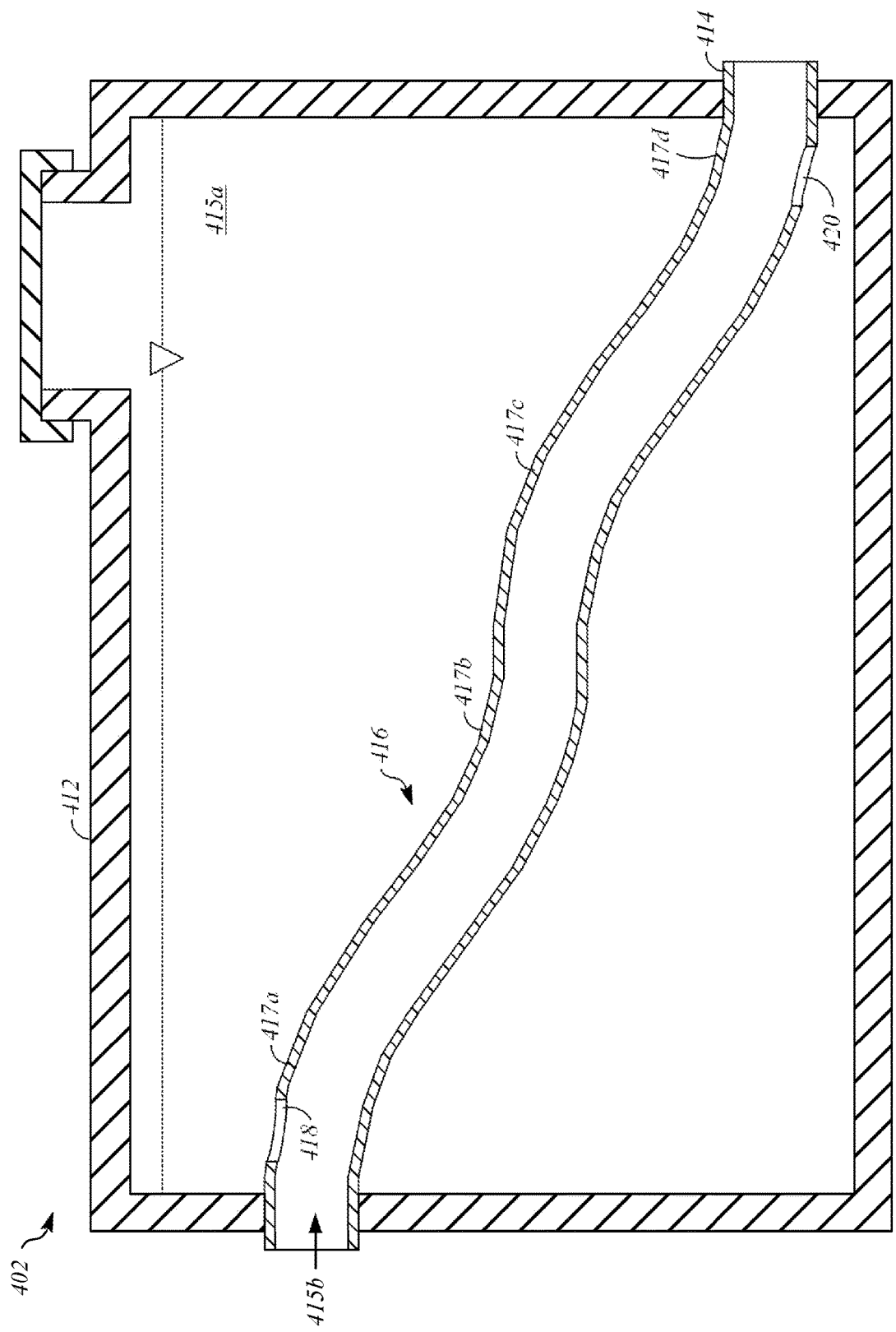
FIG. 4 is a cross-section illustration that shows a deaeration device of the thermal system according to a third example.

FIG. 4 is a cross-section illustration that shows a deaeration device 402 according to a further example that can be incorporated in the thermal system 100 in place of the deaeration device 102. The deaeration device 402 includes a reservoir 412, a first fluid portion 415a in the reservoir 412, a conduit 414, a second fluid portion 415b that follows a fluid flow path in the conduit 414, a compound curvature 416 defined by the conduit 414 to function as a pressure regulating structure, a fluid exit 418, and a fluid entrance 420. These components are as described with respect to similar components of the deaeration device 302, except as noted.

As a pressure regulating structure, the deaeration device 402 includes the compound curvature 416, which is defined along the fluid flow path of the conduit 414. In the illustrated example, the compound curvature 416 includes a first curve 417a, a second curve 417b, a third curve 417c, and a fourth curve 417d. The first curve 417a, the second curve 417b, the third curve 417c, and the fourth curve 417d are two pairs of reverse curves in a stair step configuration, turning downward, then level, then downward, then level.

In the illustrated example, the fluid exit 418 is located along the first curve 417a on the radially outward side (upward facing) of the conduit 414 relative to the first curve 417a, and the fluid entrance 420 is located along the fourth curve 417d on the radially outward side (downward facing) of the conduit 414 relative to the fourth curve 417d. The fluid exit 418 and the fluid entrance 420 can be positioned differently. For example, the fluid exit 418 can be located before the first curve 417a in a fluid flow direction, and the fluid entrance 420 can be located after the fourth curve 417d in a fluid flow direction.

The conduit 414 includes an elevation change relative to the reservoir 412 at the compound curvature 416. A first portion of the fluid flow path defined by the conduit 414 is located before the compound curvature 416 in a fluid-flow direction, a second portion of the fluid flow path defined by the conduit 414 is located after the compound curvature 416 in the fluid-flow direction, and a first elevation of the first portion of the fluid flow path is higher than a second elevation of a second portion of the fluid flow path.

Figure 5:
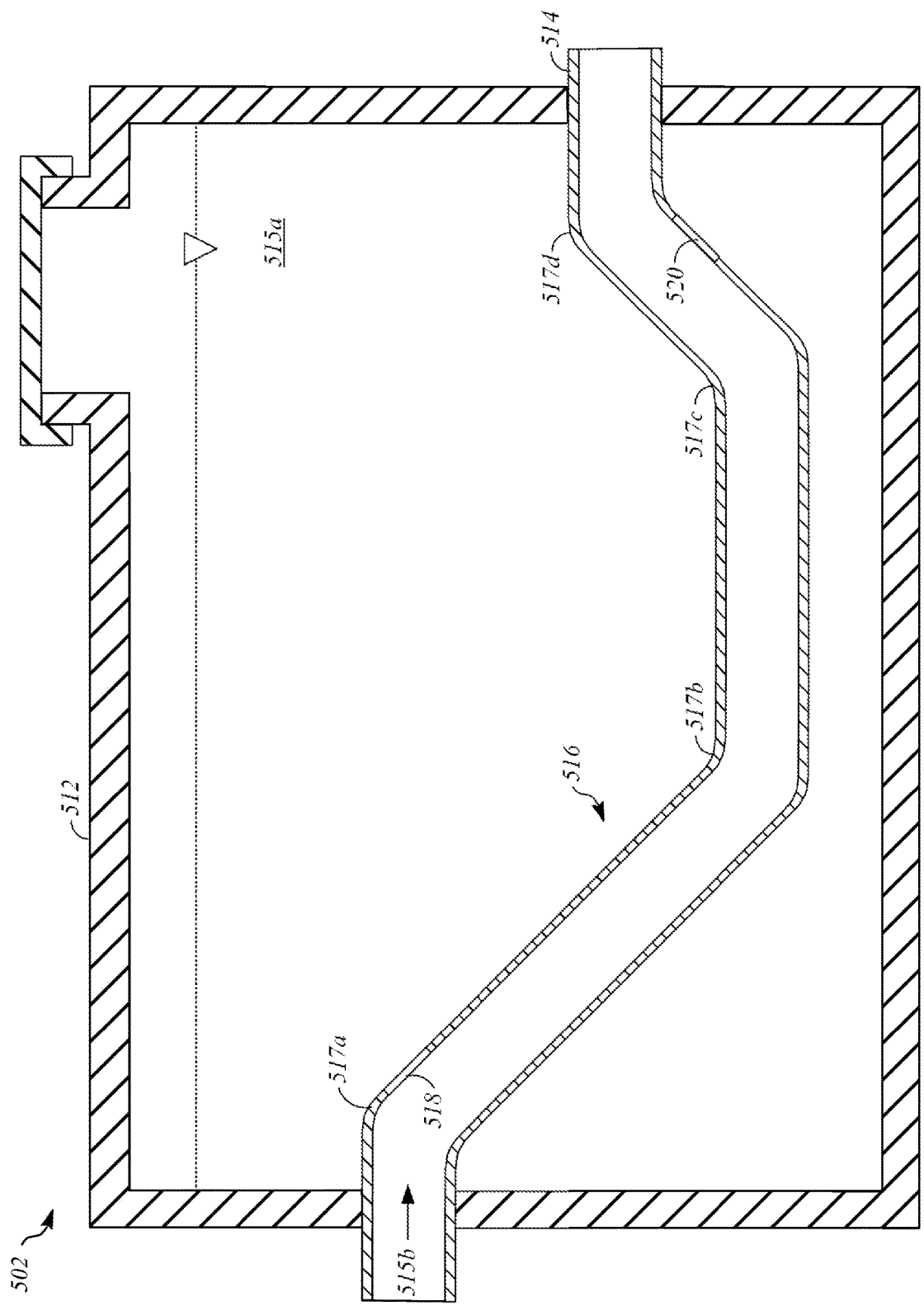
FIG. 5 is a cross-section illustration that shows a deaeration device of the thermal system according to a fourth example.

FIG. 5 is a cross-section illustration that shows a deaeration device 502 according to a further example that can be incorporated in the thermal system 100 in place of the deaeration device 102. The deaeration device 502 includes a reservoir 512, a first fluid portion 515a in the reservoir 512, a conduit 514, a second fluid portion 515b that follows a fluid flow path in the conduit 514, a compound curvature 516 defined by the conduit 514 to function as a pressure regulating structure, a fluid exit 518, and a fluid entrance 520. These components are as described with respect to similar components of the deaeration device 302, except as noted.

As a pressure regulating structure, the deaeration device 502 includes the compound curvature 516, which is defined along the fluid flow path of the conduit 514. In the illustrated example, the compound curvature 516 includes a first curve 517a, a second curve 517b, a third curve 517c, and a fourth curve 517d. The first curve 517a, the second curve 517b, the third curve 517c, and the fourth curve 517d are two pairs of reverse curves in a u-shaped configuration, turning downward, then level, then upward, then level.

In the illustrated example, the fluid exit 518 is located along the first curve 517a on the radially outward side (upward facing) of the conduit 514 relative to the first curve 517a, and the fluid entrance 520 is located along the fourth curve 517d on the radially inward side (downward facing) of the conduit 514 relative to the fourth curve 517d. The fluid exit 518 and the fluid entrance 520 can be positioned differently. For example, the fluid exit 518 can be located before the first curve 517a in a fluid flow direction, and the fluid entrance 520 can be located after the fourth curve 517d in a fluid flow direction.

The conduit 514 includes an elevation change relative to the reservoir 512 at the compound curvature 516. A first portion of the fluid flow path defined by the conduit 514 is located before the compound curvature 516 in a fluid-flow direction, a second portion of the fluid flow path defined by the conduit 514 is located after the compound curvature 516 in the fluid-flow direction, and a first elevation of the first portion of the fluid flow path is higher than a second elevation of a second portion of the fluid flow path.

Figure 6:
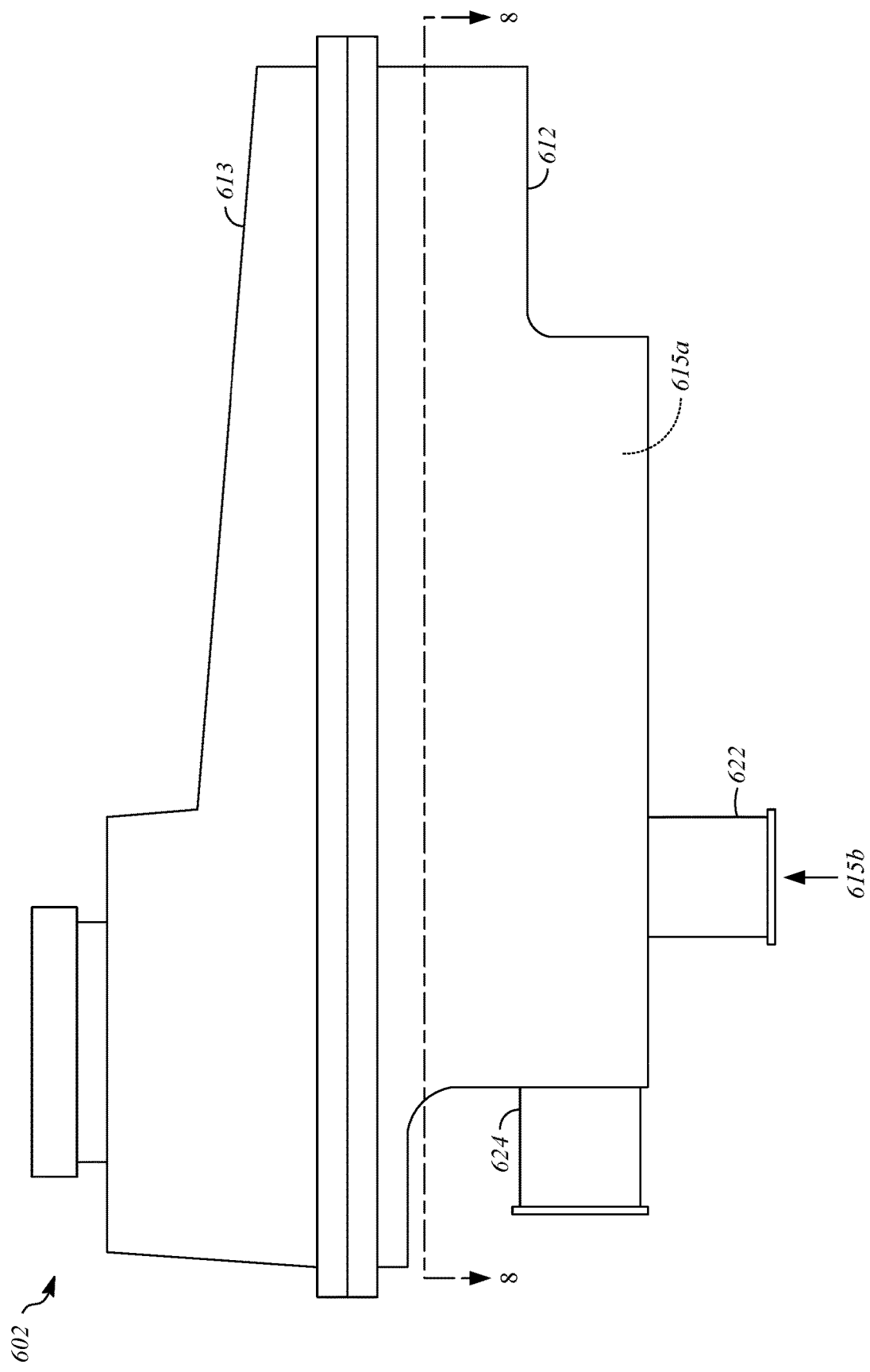
FIG. 6 is a side view illustration that shows a deaeration device according to a fifth example.

FIG. 6 is a side view illustration that shows a deaeration device 602 according to a further example that can be incorporated in the thermal system 100 in place of the deaeration device 102. The deaeration device 602 includes a reservoir 612, a cover 613, a first fluid portion 615a in the reservoir 612, a fluid inlet 622 that is connected to the reservoir 612 to receive a second fluid portion 615b, and a fluid outlet 624 that is connected to the reservoir 612. The cover 613 is connected to the reservoir 612, for example, by fasteners or by snap fit, and may be removable. The cover 613 may include an opening that is fitted with a cap, for example, to allow fluid to be added to or removed from the reservoir 612. Other components may be connected to and/or extend through openings formed through the reservoir 612 and/or the cover 613.

Figure 7:
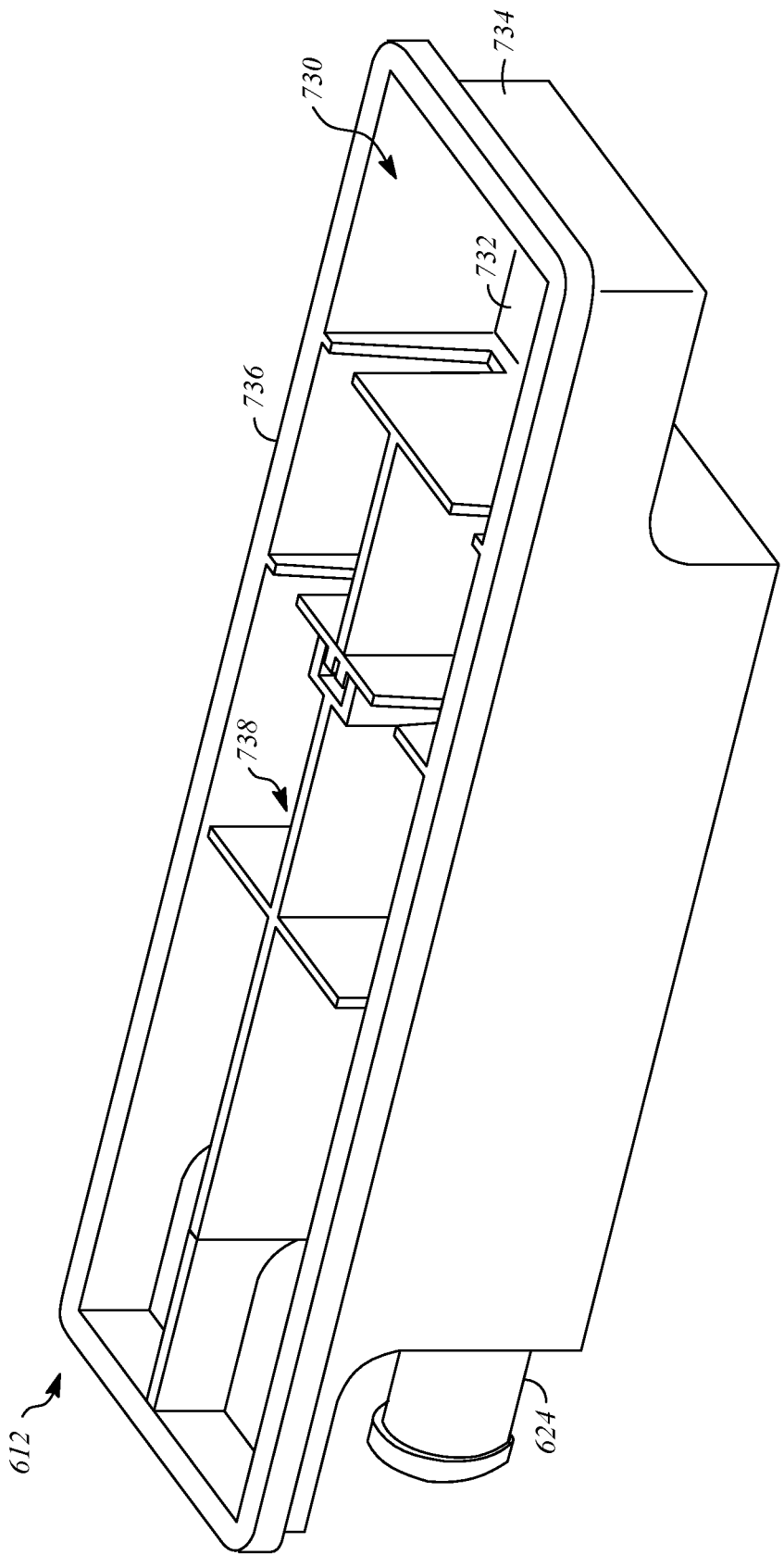
FIG. 7 is a perspective view that shows a reservoir of the deaeration device of FIG. 6.

FIG. 7 is a perspective view that shows the reservoir 612 of the deaeration device 602. The reservoir 612 is configured to contain the first fluid portion 615a (not shown in FIG. 7) within an internal space 730 that is defined by a bottom wall 732, a peripheral wall 734 that extends generally upward from the bottom wall 732, and a rim 736 that is formed at the upper extent of the peripheral wall 734 and is configured for connection to the cover 613. In the illustrated example, the reservoir 612 is generally rectangular, with slight deviations from a true rectangular shape in the form of, as examples, discontinuities in the elevation of the bottom wall 732, and angles and tapers applied to the peripheral wall 734. It should be understood, however, that any suitable geometric configuration can be utilized for the reservoir 612. As an example, the shape of the reservoir 612 may be dictated by packaging constraints.

A baffle assembly 738 is located within the internal space 730 of the reservoir 612 in order to divide the internal space 730. The baffle assembly 738 also serves to control flow of the first fluid portion 615a within the internal space 730, as will be described in detail herein. Portions of the baffle assembly 738 or all of the baffle assembly 738 may, in some implementations, be formed integrally with the reservoir 612 of the deaeration device 602.

Figure 8:
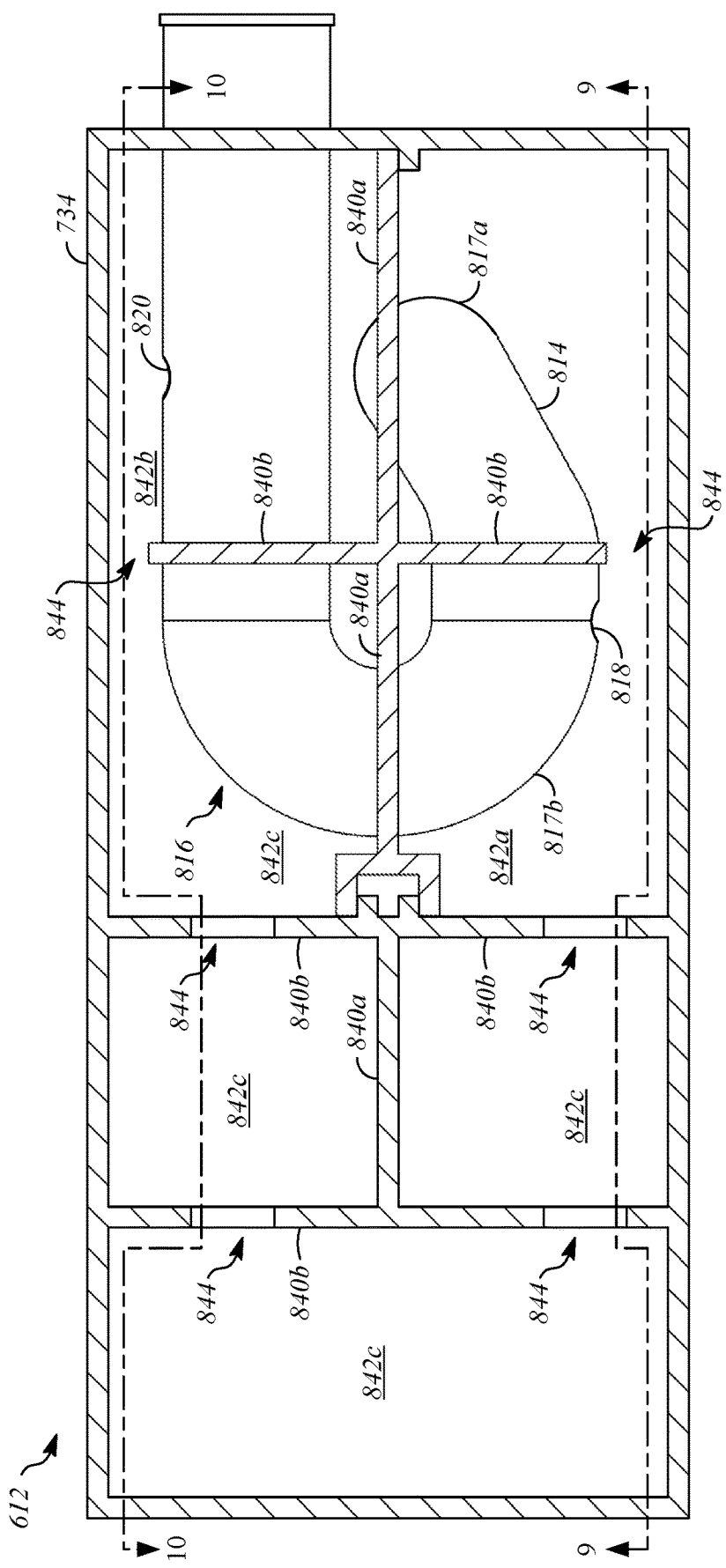
FIG. 8 is a cross-section view of the reservoir of the deaeration device of FIG. 6, taken along line 8-8 of FIG. 6.

FIG. 8 is a cross-section view of the reservoir 612 of the deaeration device 602, taken along line 8-8 of FIG. 6, showing the baffle assembly 738 and a conduit 814. The baffle assembly 738 includes longitudinally extending wall portions 840a and the laterally extending wall portions 840b. The longitudinally extending wall portions 840a and the laterally extending wall portions 840b divide the internal space 730 of the reservoir 612 into chambers that each contain part of the first fluid portion 615a and enforce a direction for flow of the first fluid portion 615a within the internal space 730 of the reservoir 612. The longitudinally extending wall portions 840a extend generally upward relative to the bottom wall 732 of the reservoir 612 and have a generally planar configuration that also extends along a long axis of the reservoir 612 (i.e., in an end-to-end direction of the reservoir 612). The laterally extending wall portions 840b extend generally upward relative to the bottom wall 732 of the reservoir 612 and have a generally planar configuration that also extends along a short axis of the reservoir 612 (i.e., in a side-to-side direction of the reservoir 612). The laterally extending wall portions 840b intersect the longitudinally extending wall portions 840a, such that the longitudinally extending wall portions 840a and the laterally extending wall portions 840b cooperate to divide the internal space 730 of the reservoir 612.

In the illustrated example, the internal space 730 of the reservoir 612 is divided into multiple chambers by the baffle assembly 738, including an exit chamber 842a (where fluid exits the conduit 814, as will be described herein), an entrance chamber 842b (where fluid enters the conduit 814, as will be described herein), and intermediate chambers 842c (i.e., one or more intermediate chambers) that define a fluid flow path through the internal space 730 of the reservoir 612 between the exit chamber 842a and the entrance chamber 842b. Adjacent chambers from the exit chamber 842a, the entrance chamber 842b, and the intermediate chambers 842c may be connected by fluid passages 844. As examples, the fluid passages 844 may be defined as gaps between the baffle assembly 738 and the reservoir 612 (i.e., a gap relative to the bottom wall 732 and/or the peripheral wall 734), or as openings (e.g., in the form of apertures of notches relative to a top edge of the baffle assembly 738). In the case of openings formed through the longitudinally extending wall portions 840a or the laterally extending wall portions 840b of the baffle assembly 738, a bottom edge of the opening may be spaced above the elevation of the bottom wall 732 of the reservoir 612.

Figure 9:
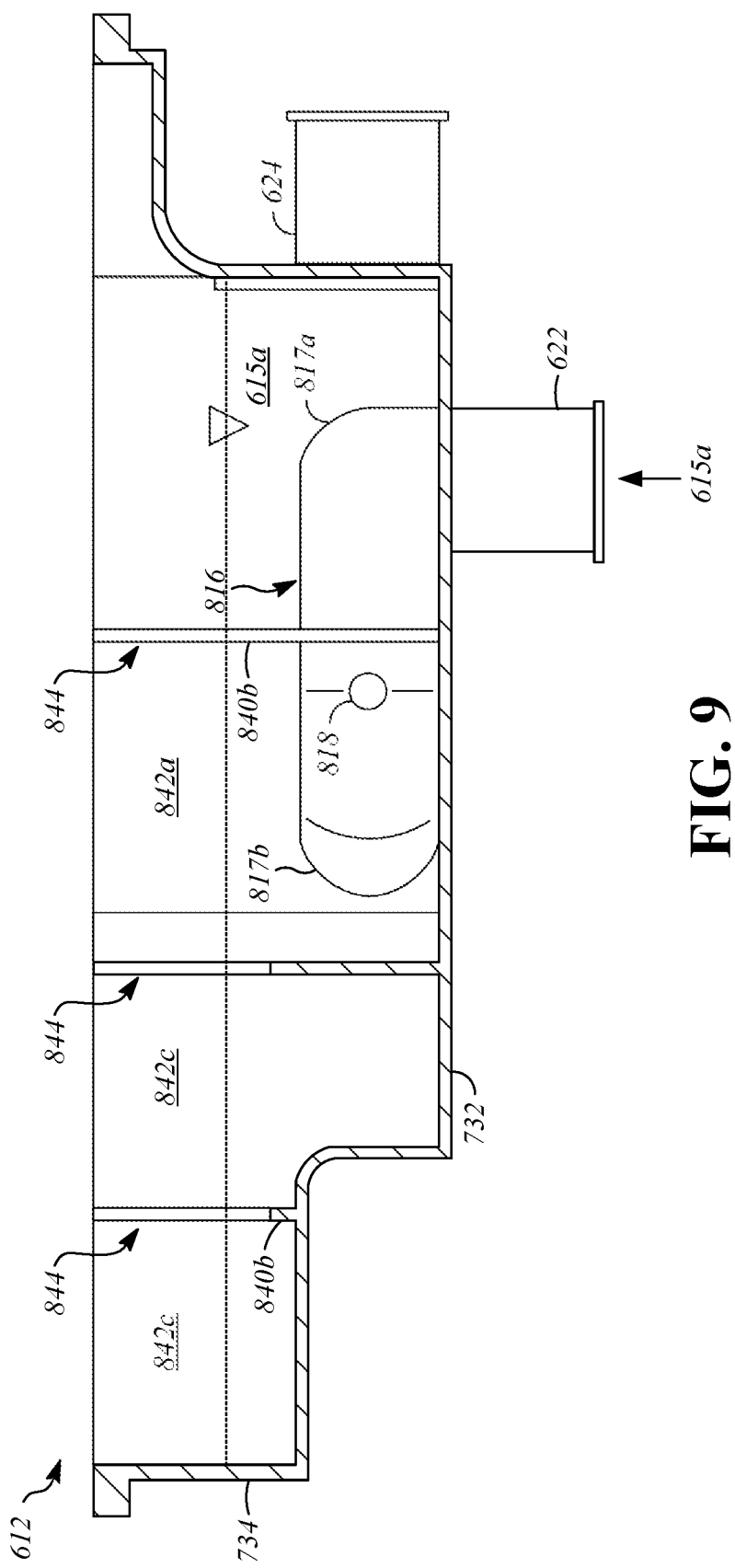
FIG. 9 is a cross-section view of the reservoir of the deaeration device of FIG. 6, taken along line 9-9 of FIG. 8.
Figure 10:
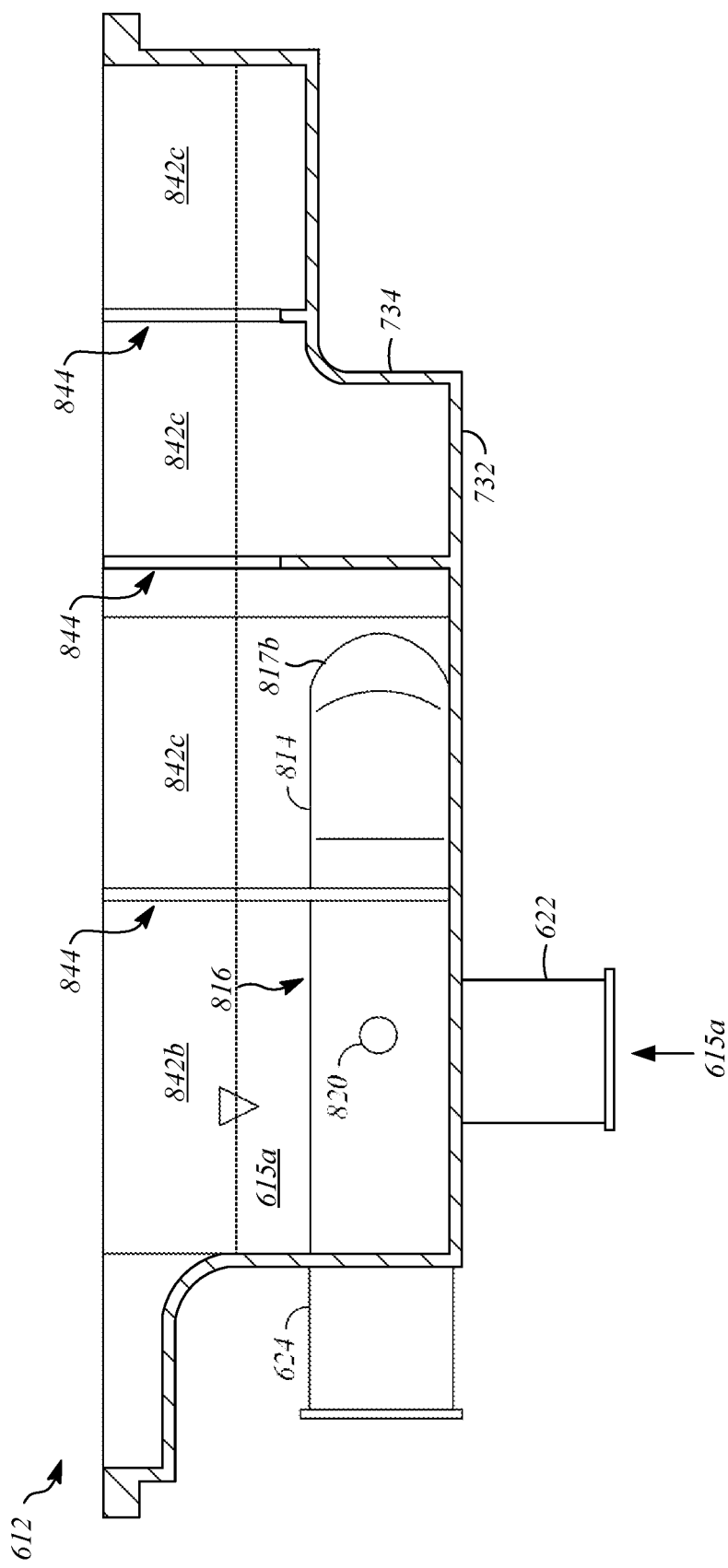
FIG. 10 is a cross-section view of the reservoir of the deaeration device of FIG. 6, taken along line 10-10 of FIG. 8.

FIG. 9 is a cross-section view of the reservoir of the deaeration device of FIG. 6, taken along line 9-9 of FIG. 8, and FIG. 10 is a cross-section view of the reservoir of the deaeration device of FIG. 6, taken along line 10-10 of FIG. 8. As seen in FIGS. 8-10, the conduit 814 is located in the internal space 730 of the reservoir 612. The conduit 814 is connected to the fluid inlet 622 and the fluid outlet 624 and defines a fluid flow path that carries the first fluid portion 615a. As described in previous examples, most of the fluid that enters the conduit 814 as the first fluid portion 615a is carried through the reservoir 612 within the conduit 814 without joining the second fluid portion 615b within the internal space 730 of the reservoir 612, as the walls of the conduit 814 separate the interior of the conduit 814 from the remainder of the internal space 730 of the reservoir.

In order to deaerate the first fluid portion 615a, part of the first fluid portion 615a leaves the conduit 814 and joins the second fluid portion 615b at a fluid exit 818, and part of the second fluid portion 615b, after deaeration within the internal space 730, leaves the internal space 730 and joins the first fluid portion 615a within the conduit 814 at a fluid entrance 820. The fluid exit 818 is located in the exit chamber 842a that is defined in the internal space 730 of the reservoir 612 by the baffle assembly 738. The fluid entrance 820 is located in the entrance chamber 842b that is defined in the internal space 730 of the reservoir 612 by the baffle assembly 738. Thus, in order for fluid within the second fluid portion 615b to flow from the fluid exit 818 to re-enter the conduit 814 at the fluid entrance 820, the fluid travels through the exit chamber 842a, through one or more of the intermediate chambers 842c, and through the entrance chamber 842b, where it may re-enter the conduit 814 at the fluid entrance 820.

A curvature 616 is defined by the conduit 814 to function as a pressure regulating structure, so that part of the first fluid portion 615a leaves the conduit 814 at the fluid exit 818, and so that part of the second fluid portion 615b enters the conduit 814 at the fluid entrance 820.

In the illustrated example, the conduit 814, the fluid exit 818, and the fluid entrance 820 all have circular cross-sections. The diameters of the fluid exit 818 and the fluid entrance 820 are half or less of the diameter of the inside diameter of the conduit 814. The fluid exit 818 and the fluid entrance 820 can be the same size or can be different sizes. Although the fluid exit 818 and the fluid entrance 820 are depicted as single openings, each can be implemented as multiple openings.

As a pressure regulating structure, the deaeration device 602 includes the curvature 816, which is defined along the fluid flow path of the conduit 814. In the illustrated example, the curvature 816 includes a first curve 817a and a second curve 817b. The first curve 817a is an approximately ninety-degree bend in the conduit 814 that occurs just above the bottom wall 732 of the reservoir 612 after the conduit 814 passes through the bottom wall 732 on a path that is generally perpendicular to the bottom wall 732. As used herein, the term "approximately" includes deviations expected as a result of manufacturing variations and measuring variations. Within the reservoir 612, including along the second curve 817b, the path of the conduit 814 lies in a plane that is generally parallel to the bottom wall 732 of the reservoir 612. In some implementations, the second curve 817b extends along an arc that is greater than or equal to ninety degrees. In some implementations, the second curve 817b extends along an arc that is greater than or equal to one-hundred and eighty degrees. In the illustrated example, the second curve 817b extends along an arc that is greater than one-hundred and eighty degrees and is less than two-hundred and seventy degrees. Along the second curve 817b, the conduit 814 passes through one of the longitudinally extending wall portions 840a of the baffle assembly 738.

In the illustrated example, the fluid exit 818 is positioned along the curvature 816 between the first curve 817a and the second curve 817b, near the beginning of the second curve 817b, and on the radially outward side of the conduit 814 relative to the second curve 817b, and the fluid entrance 820 is located after the curvature 816, along a straight section of the conduit 814. The fluid exit 818 and the fluid entrance 820 can, however, be positioned differently relative to the curvature 816. As a result of the pressure-regulating structure defined by the curvature 816, the fluid exit 818 is located at a first end of the curvature 816 in a high-pressure region and the fluid entrance 820 is located at a second end of the curvature 816 in a low-pressure region.

In the illustrated example, the fluid exit 818 and the fluid entrance 820 of the conduit 814 are located at a common elevation. The fluid exit 818 and the fluid entrance 820 could, however, be located at different elevations. As previously described, the fluid exit 818 and the fluid entrance 820 can each include a single opening that is formed in the conduit 814 or multiple openings that are formed through the conduit 814. The conduit 814 may be otherwise free from openings in the internal space 730 of the reservoir.

What is claimed is:

1. A deaeration device for a fluid, comprising:
   a reservoir that contains a portion of the fluid;
   a conduit that carries a portion of the fluid through the reservoir, the conduit having a first curve and a second curve that are curved in opposite directions along a fluid flow path;
   a fluid exit defined by the conduit, wherein the first curve and the second curve create a high-pressure region in the conduit at the fluid exit that causes some of the fluid to pass out of the conduit at the fluid exit and join the fluid in the reservoir; and
   a fluid entrance defined by the conduit, wherein the first curve and the second curve create a low-pressure region in the conduit at the fluid entrance that causes some of the fluid from the reservoir to pass into the conduit at the fluid entrance.

2. The deaeration device of claim 1, wherein the fluid exit is located at a first end of the conduit in the high-pressure region and the fluid entrance is located at a second end of the conduit in the low-pressure region.

3. The deaeration device of claim 1, wherein a first elevation of the first curve is higher than a second elevation of the second curve.

4. The deaeration device of claim 1, wherein the fluid exit is located along the first curve, and the fluid entrance is located along the second curve.

5. The deaeration device of claim 4, wherein the fluid exit is located on a first radially outward side of the conduit and the fluid entrance is located on a second radially outward side of the conduit.

6. The deaeration device of claim 1, wherein the fluid exit is located before the first curve in a fluid flow direction, and the fluid entrance is located after the second curve in the fluid flow direction.

7. The deaeration device of claim 1, wherein the fluid entrance includes a single opening and the fluid exit includes a single opening.

8. The deaeration device of claim 1, wherein the fluid entrance includes multiple openings and the fluid exit includes multiple openings.

9. The deaeration device of claim 1, wherein the conduit, the fluid exit, and the fluid entrance have circular cross-sections.

10. The deaeration device of claim 9, wherein the fluid exit and the fluid entrance each have a diameter that is more than fifty percent smaller than an inner diameter of the conduit.

11. A deaeration device for a fluid, comprising:
a reservoir that contains a portion of the fluid;
a fluid flow path that carries a portion of the fluid;
a pressure regulating structure having a first reverse curve and a second reverse curve defined along the fluid flow path;
wherein the first reverse curve causes some of the fluid to pass through a fluid exit in the fluid flow path and join the fluid in the reservoir; and
wherein the second reverse curve causes some of the fluid from the reservoir to pass through a fluid entrance in the fluid flow path and join the fluid in the fluid flow path.

12. The pressure regulating structure of claim 11, further comprising a conduit that defines the first reverse curve and the second reverse curve, the first reverse curve including a first curve and a second curve, and the second reverse curve including a third curve and a fourth curve.

13. The pressure regulating structure of claim 12, wherein the fluid exit is located along the first curve and the fluid entrance is located along the fourth curve.

14. The pressure regulating structure of claim 13, wherein the fluid exit is located on a first radially outward side of the conduit and the fluid entrance is located on a second radially outward side of the conduit.

15. The deaeration device of claim 14, wherein the conduit extends through the reservoir.

16. The pressure regulating structure of claim 11, wherein the first reverse curve and the second reverse curve have a stair step configuration.

17. The pressure regulating structure of claim 16, wherein the stair step configuration is directed downward along the fluid flow path.

18. A deaeration device for a fluid, comprising:
a reservoir that contains a portion of the fluid;
a fluid flow path that carries a portion of the fluid;
a pressure regulating structure having a first curve and a second curve defined along the fluid flow path, wherein the pressure regulating structure creates a high-pressure region along the fluid flow path and the second curve creates a low-pressure region along the fluid flow path;
wherein the high-pressure region causes some of the fluid to exit the fluid flow path through a fluid exit and join the fluid in the reservoir; and
wherein the low-pressure region causes some of the fluid from the reservoir to join the fluid flow path through a fluid entrance.

19. The pressure regulating structure of claim 18, wherein the first curve directs the fluid downward along the fluid flow path and the second curve directs the fluid upward along the fluid flow path.

20. The pressure regulating structure of claim 18, wherein the first curve and the second curve are arranged in a u-shape configuration.

* * * * *